United States Patent
Ikuyama et al.

(10) Patent No.: US 12,257,910 B2
(45) Date of Patent: Mar. 25, 2025

(54) POWER CONVERSION APPARATUS

(71) Applicant: HITACHI ASTEMO, LTD., Hitachinaka (JP)

(72) Inventors: Takeshi Ikuyama, Hitachinaka (JP); Koichi Yahata, Hitachinaka (JP); Shinichirou Hida, Hitachinaka (JP); Yawara Kato, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 18/262,590

(22) PCT Filed: Sep. 30, 2021

(86) PCT No.: PCT/JP2021/036287
§ 371 (c)(1),
(2) Date: Jul. 24, 2023

(87) PCT Pub. No.: WO2022/163019
PCT Pub. Date: Aug. 4, 2022

(65) Prior Publication Data
US 2024/0424916 A1    Dec. 26, 2024

(30) Foreign Application Priority Data
Jan. 29, 2021 (JP) ................................ 2021-012638

(51) Int. Cl.
*B60L 50/51* (2019.01)
*H02J 7/00* (2006.01)

(52) U.S. Cl.
CPC .......... *B60L 50/51* (2019.02); *H02J 7/00308* (2020.01); *B60L 2210/42* (2013.01); *H02J 2207/50* (2020.01)

(58) Field of Classification Search
None
See application file for complete search history.

(56) References Cited

U.S. PATENT DOCUMENTS

| | | | | |
|---|---|---|---|---|
| 2015/0364984 A1* | 12/2015 | Miyauchi | ............ | H02M 7/5387 363/132 |
| 2022/0182006 A1* | 6/2022 | Nakamura | .......... | H02M 3/1584 |
| 2023/0268841 A1* | 8/2023 | Liu | .......................... | H02J 7/02 320/140 |

FOREIGN PATENT DOCUMENTS

| | | |
|---|---|---|
| JP | 2010-284029 A | 12/2010 |
| JP | 2013-226050 A | 10/2013 |

(Continued)

OTHER PUBLICATIONS

International Search Report with English Translation and Written Opinion dated Nov. 16, 2021 in corresponding International Patent Application No. PCT/JP2021/036287 (8 pages).

*Primary Examiner* — Carlos Amaya
*Assistant Examiner* — Aqeel H Bukhari
(74) *Attorney, Agent, or Firm* — Foley & Lardner LLP (57) ABSTRACT

There are provided a plurality of drive circuits (103 U, 103 L) for driving respective plural switching devices constituting upper arms and lower arms, a power supply circuit for supplying a power supply to the plurality of drive circuits, and a discharge circuit for discharging a capacitor. The power supply circuit includes a first transformer (201U) for the upper arms, and a second transformer (201L) for the lower arms, which include a primary winding connected in parallel to a DC power supply. The first transformer and the second transformer include a secondary winding for supplying a power supply to the drive circuits and for supplying a power supply to a low-voltage circuit (110). Each of the first transformer and the second transformer includes a feedback winding for outputting the voltage output to the drive circuits, to a power supply control IC. The discharge circuit (120) is driven by a power supply supplied from the feedback winding.

4 Claims, 9 Drawing Sheets

(56) References Cited

FOREIGN PATENT DOCUMENTS

| | | |
|---|---|---|
| JP | 2014-33552 A | 2/2014 |
| JP | 2015-159684 A | 9/2015 |
| JP | 2016-1960 A | 1/2016 |

* cited by examiner

POWER CONVERSION APPARATUS

TECHNICAL FIELD

The present invention relates to power conversion apparatuses, and particularly relates to power conversion apparatuses mounted on electric vehicles.

BACKGROUND ART

An electric vehicle such as a hybrid car includes a power conversion apparatus (an inverter apparatus) for supplying AC power to a driving motor. Such a power conversion apparatus operates by electric power supplied from a power supply (a battery) with a high voltage ranging from several tens to several hundreds of volts. On the other hand, a control circuit for controlling the power conversion apparatus is operated by a power supply with a relatively low voltage of about 12 V.

A gate driver circuit in the power conversion apparatus using the high-voltage power supply is a high-voltage circuit and, therefore, needs to be isolated from a low-voltage circuit. Therefore, a power supply for the gate driver circuit (which will be referred to as a GD power supply hereinafter) is provided from an isolated power supply using a transformer. A power conversion apparatus for driving a commonly-used three phase AC motor includes six semiconductor devices in upper and lower arms for the three phases, which necessitates GD power supplies and gate driver circuits for driving the semiconductor devices for the six arms. In addition, there is a need for a backup power supply (which will be referred to as a BKPS, hereinafter) for providing a low-voltage power supply from a high-voltage power supply, in order to perform a safety control operation for safely stopping an inverter in the event of a loss of a low-voltage power supply, which is one of failure conditions to be assumed. Furthermore, in some cases, when the power conversion apparatus is stopped, it is necessary to discharge (actively discharge) charge with a high voltage accumulated in a smoothing condenser in the power conversion apparatus within several seconds, which necessitates an active discharge power supply.

For example, Patent Literature 1 describes a structure for generating a GD power supply for three phases of upper arms from a low-voltage power supply while generating a BKPS, and a GD power supply for three phases of lower arms, simultaneously, from a high-voltage power supply while generating a BKPS, as a method for generating GD power supplies. With the power conversion apparatus in Patent Literature 1, even when the low-voltage power supply is lost, it is possible to perform an operation for three-phase short-circuiting, which is one of safety controls.

CITATION LIST

Patent Literature

Patent Literature 1: Japanese Patent Application Laid-Open No. 2015-159684

SUMMARY OF INVENTION

Technical Problem

Conventionally, there have been generally structures (of a centralized type) adapted to generate all of such a plurality of power supplies by one transformer, and structures (of a distributed type) adapted to provide transformers and power supply circuits for respective power supplies. In the case of the centralized type, if a loss of the low-voltage power supply and a failure of a power supply occur at the same time, it is impossible to perform a safety control operation. In the case of the distributed type, even if one of the GD power supplies for the six arms is broken when the low-voltage power supply is lost, it is possible to perform three-phase short-circuiting, which is one of safety controls. However, in the event of a failure of the BKPS, the safety control circuit cannot be supplied with a power supply. In the event of a failure of the active discharge power supply, it is impossible to perform an operation for active discharge. With the power conversion apparatus described in Patent Literature 1, in the event of a failure of the GD power supply for the lower arms when the low-voltage power supply is lost, it is impossible to operate the control circuit, which makes it impossible to perform a safety control operation.

It is a main object of the present invention to provide a power conversion apparatus capable of performing a safety control operation even if such a loss of low-voltage power supply and a failure of a power supply occur at the same time.

Solution to Problem

As a power conversion apparatus according to the present invention, there is provided a power conversion apparatus for converting DC power supplied from a DC power supply into AC power, the power conversion apparatus includes:
- a plurality of switching devices constituting upper arms and lower arms of respective phases in a three-phase inverter circuit;
- a plurality of drive circuits for driving the respective plurality of switching devices;
- a power supply circuit for suppling a power supply to the plurality of drive circuits; and
- a discharge circuit for discharging a capacitor connected in parallel to the three-phase inverter circuit;
- wherein the power supply circuit includes a first transformer and a second transformer which include a primary winding connected in parallel to the DC power supply,
- the first transformer includes a secondary winding for supplying a power supply to the drive circuits for driving the plurality of switching devices constituting the upper arms, and for supplying a power supply to a low-voltage circuit connected to a low-voltage power supply, and
- the second transformer includes a secondary winding for supplying a power supply to the drive circuits for driving the plurality of switching devices constituting the lower arms and for supplying a power supply to the low-voltage circuit, and
- each of the first transformer and the second transformer includes a feedback winding for outputting a feedback voltage corresponding to a voltage outputted to the drive circuits, to a power supply control IC, and
- the discharge circuit is driven by a power supply supplied from the feedback winding in the first transformer and the feedback winding in the second transformer.

Advantageous Effects of Invention

According to the present invention, it is possible to provide a power conversion apparatus capable of performing a safety control operation even when a low-voltage power supply loss and a power supply failure overlap.

DESCRIPTION OF EMBODIMENTS

Hereinafter, an embodiment of the present invention will be described with reference to the drawings. The following description and drawings are merely examples for describing the present invention, and omission and simplification are made thereto appropriately for the sake of clarification of description. The present invention can be implemented in other various other aspects. Unless otherwise specified, as each constituent component, it is possible to provide one or plural such constituent components. In some cases, the position, the size, the shape, the range and the like of each constituent component illustrated in the drawings may not represent its actual position, size, shape, range and the like, in order to facilitate understanding of the invention. Therefore, the invention is not necessarily limited to the positions, sizes, shapes, ranges and the like disclosed in the drawings. In a case where there are plural constituent components having the same or similar functions, these constituent components may be described by attaching, thereto, the same reference numeral with different subscripts. However, in a case where it is not necessary to distinguish these plural constituent components, these constituent components may be described by omitting such subscripts.

Figure 1:
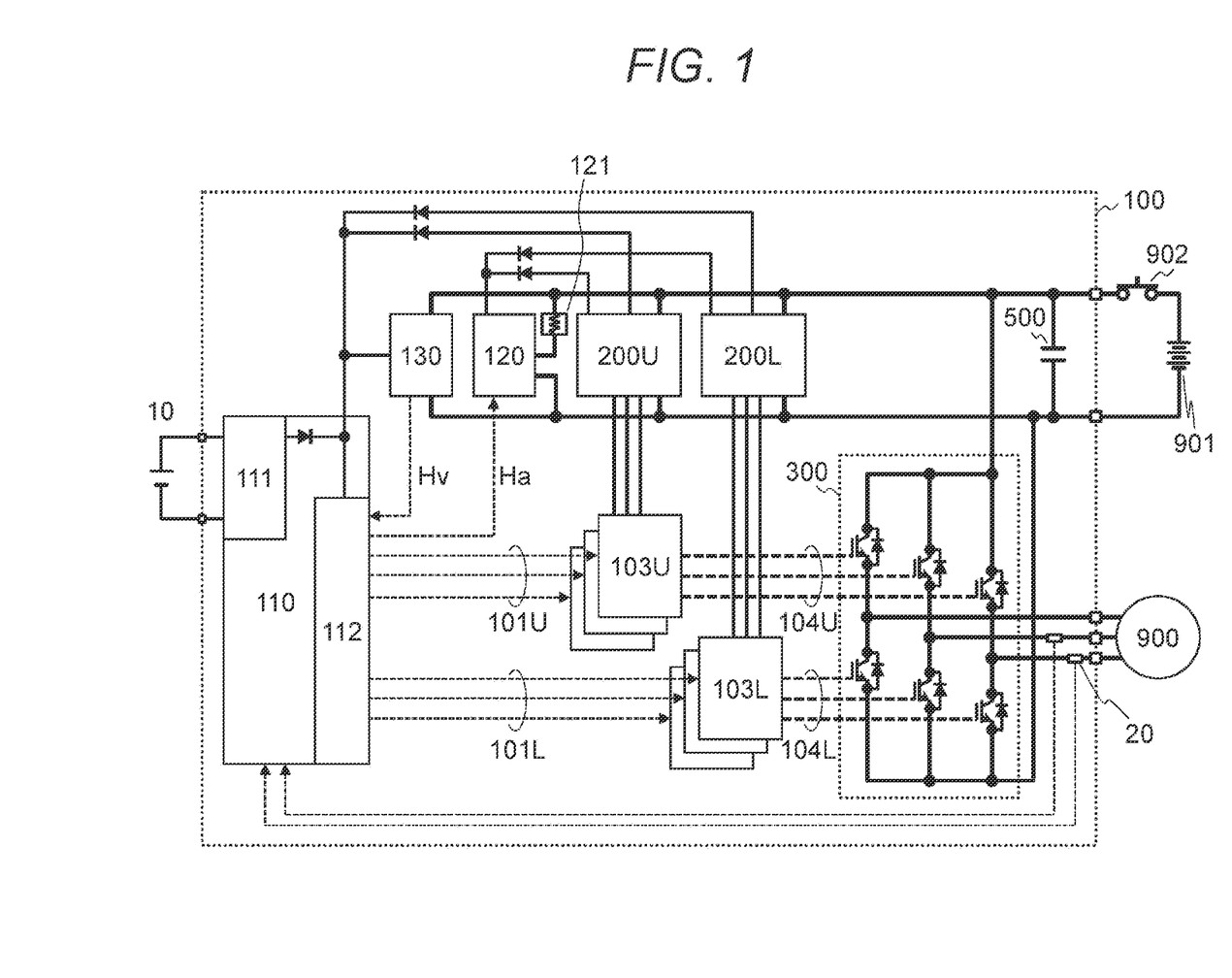
FIG. 1 is a view of the overall structure of a power conversion apparatus 100.

FIG. 1 is a view of the overall structure of a power conversion apparatus 100. The power conversion apparatus 100 converts DC power supplied from a DC power supply 901 through a contactor 902 into AC power and drives a motor 900. When the motor 900 is rotated by an external force, the motor 900 functions as a generator, and the power conversion apparatus 100 converts AC power into DC power and charges the DC power supply 901. The DC power supply 901 is constituted by, for example, a high voltage battery.

The power conversion apparatus 100 includes a motor control circuit 110, an inverter circuit 300, a voltage smoothing capacitor 500, and the like.

The motor control circuit 110 receives a command for driving the motor 900, such as a torque command or a rotation command, from a host controller which is not illustrated. Then, the motor control circuit 110 provides gate driving commands 101U and 101L according to the command, to gate drive circuits 103U and 103L through buffer circuits, respectively. The gate driving command 101U and the gate drive circuit 103U correspond to upper arms in the inverter circuit 300, and the gate driving command 101L and the gate drive circuit 103L correspond to lower arms in the inverter circuit 300.

The gate drive circuits 103U and 103L output gate driving signals 104U and 104L for driving switching devices in the upper arms and the lower arms in the inverter circuit 300, in accordance with the gate driving commands 101U and 101L. The inverter circuit 300 drives the respective switching devices in accordance with the gate driving signals 104U and 104L to convert the DC power supplied from the DC power supply 901 into AC power, thereby driving the motor 900. The inverter circuit 300 includes three switching devices in the upper arms and three switching devices in the lower arms. Further, the inverter circuit 300 is supplied with DC power from the DC power supply 901 through bus bars.

The gate drive circuit 103U is constituted by three drive circuits corresponding to the three switching device in the upper arms. Similarly, the gate drive circuit 103L is constituted by three drive circuits corresponding to the three switching devices in the lower arms. The gate drive circuits 103U and 103L include an overcurrent detection unit for monitoring the current flowing through each switching device, and notify the motor control circuit 110 of an overcurrent detection signal, in the event of detection of an overcurrent.

There are provided current detectors 20 on the output wirings from the inverter circuit 300 to the motor 900, and the value of the current in each phase is inputted to the motor control circuit 110. Although there is illustrated an example where two current detectors 20 are provided, three current detectors may be also provided. When there are two current detectors 20, the motor control circuit 110 determines the value of the current in the remaining phase through a calculation. The motor control circuit 110 controls the torque of the motor 900 through current feedback control.

The motor control circuit 110 includes an auxiliary power supply circuit 111, and a safety control circuit 112. The auxiliary power supply circuit 111 is supplied with electric power of, for example, 12 V from a DC power supply (a low voltage battery) 10, and provides a power supply to the safety control circuit 112 through a diode. The safety control circuit 112 outputs a discharge command Ha, which will be described later, for transitioning the inverter circuit 300 to a safe state.

In addition to the voltage smoothing capacitor 500 for smoothing the applied voltage which varies during power conversion, an upper-arm gate drive power supply circuit 200U, a lower-arm gate drive power supply circuit 200L, an active discharge circuit 120, and a high voltage sensor circuit 130 are connected in parallel to the bus bars of the DC power supply 901 at the opposite poles.

The upper-arm gate drive power supply circuit 200U and the lower-arm gate drive power supply circuit 200L are supplied with a high-voltage power supply from the DC power supply 901, and provide power supplies to the gate drive circuits 103U and 103L. As will be described in detail later, the upper-arm gate drive power supply circuit 200U and the lower-arm gate drive power supply circuit 200L have the function of providing a power supply to the active discharge circuit 120 and also providing a power supply to the motor control circuit 110.

The active discharge circuit 120 discharges the voltage applied between the opposite poles of the bus bars through a discharge resistance 121, thereby lowering the voltage to a safe value, in the event of stop of a circuit in the power conversion apparatus 100, and the like. The high voltage sensor circuit 130 detects the voltage applied between the opposite poles of the bus bars and outputs the detected voltage information Hv to the safety control circuit 112. The safety control circuit 112 outputs a discharge command Ha to the active discharge circuit 120 based on the voltage information Hv from the high voltage sensor circuit 130.

The motor control circuit 110 has a first control mode for controlling on/off of the switching devices in the inverter circuit 300 for performing electric power conversion between DC power and AC power, and a second control mode for turning on all the switching devices in the upper arms or the lower arms for short-circuiting between the windings of the motor 900. In the second control mode, the inverter circuit 300 is in a three-phase short-circuiting state.

When the motor 900 is being rotated by an external force, if the input of DC power to the DC power supply 901 is cut off, the voltage smoothing capacitor 500 provided between the positive pole and the negative pole of the inverter circuit 300 is charged by the power induced by the motor 900, which increases the voltage thereacross.

The high voltage sensor circuit 130 detects the voltage applied between the opposite poles of the bus bars due to the voltage smoothing capacitor 500 having been charged by the power induced by the motor 900. Further, the high voltage sensor circuit 130 inputs the detected voltage information Hv to the safety control circuit 112. If the high voltage sensor circuit 130 detects a high voltage (overvoltage) equal to or higher than a certain reference, the safety control circuit 112 outputs a three-phase short-circuiting signal, thereby causing a transition to the second control mode. Furthermore, in the event of detection of an abnormality in the inverter operation, a transition to the second control mode is made according to the situation. The gate drive circuits 103U and 103L output gate driving signals 104U and 104L for turning on all the switching devices in the upper arms or the lower arms in the respective phases of the inverter circuit 300, in accordance with the gate driving commands 101U and 101L for instructing three-phase short-circuiting. This causes all the switching devices in the upper arms or the lower arms of the respective phases of the inverter circuit 300 to be turned on, thereby causing three-phase short-circuiting. This protects the switching devices.

In the present embodiment, the high voltage sensor circuit 130 is driven by electric power supplied from the upper-arm gate drive power supply circuit 200U and the lower-arm gate drive power supply circuit 200L. Therefore, even in the event of a failure of any one of the upper-arm gate drive power supply circuit 200U and the lower-arm gate drive power supply circuit 200L, the high voltage sensor circuit 130 can detect the voltage. Further, for example, even when the voltage in the inverter increases due to the induced voltage caused by the motor rotation during towing the vehicle, it is possible to perform control for three-phase short-circuiting, in order to prevent it from exceeding a predetermined voltage (for example, 60 V). Alternatively, in the event of a malfunction such as fixation of the contactor 902, if active discharge is continued, the discharge resistance may burn out since its loss tolerance is exceeded. However, the discharge can be stopped based on non-detection of a voltage gradient during the discharge.

The reference voltage for the high voltage sensor circuit 130 may be generated from either the low-voltage circuit or the high-voltage circuit. In the case where the reference voltage is generated from the high-voltage circuit, it is possible to utilize the same power supply as that for the active discharge circuit.

Figure 2:
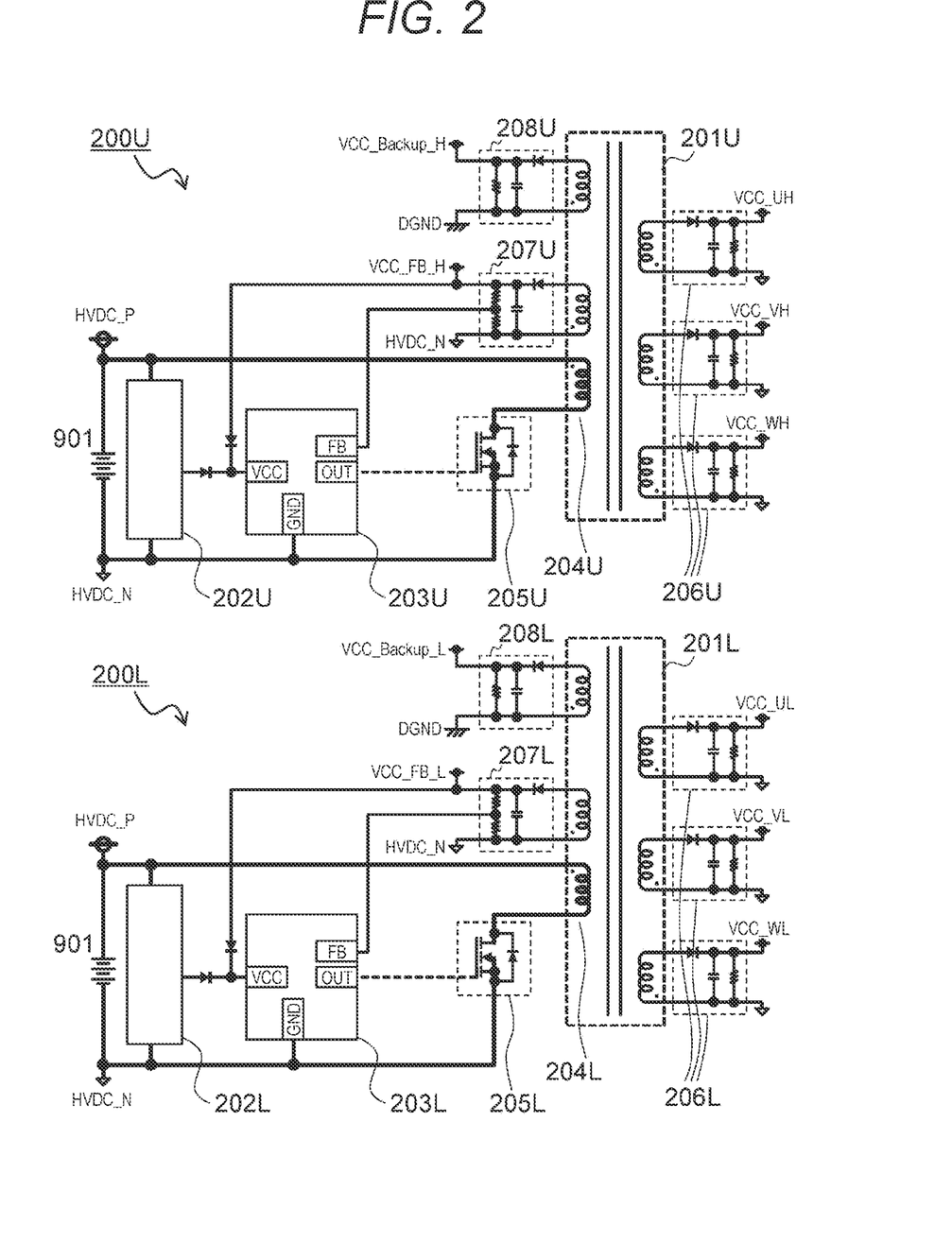
FIG. 2 is a diagram of the circuit structure of gate drive power supply circuits 200U and 200L.

FIG. 2 is a diagram of the circuit structure of the gate drive power supply circuits 200U and 200L according to the present embodiment. The gate drive power supply circuit 200U for the upper arms and the gate drive power supply circuit 200L for the lower arms have the same circuit structure and, therefore, the gate drive power supply circuit 200U for the upper arms will be described in detail here.

The gate drive power supply circuit 200U employs an isolated flyback converter scheme. The gate drive power supply circuit 200U includes a transformer 201U, an activation circuit 202U, and a power supply control IC 203U. The transformer 201U includes a primary-side winding 204U, a plurality of secondary-side winding circuits 206U, a feedback winding circuit 207U, and a backup winding circuit 208U, in its primary side and secondary side. The gate drive power supply circuit 200U in the present example includes three secondary-side winding circuits 206U, which are applied as power supplies to the gate electrodes of the switching devices in the upper arms of the inverter circuit 300.

An FET 205U is connected in series to the primary-side winding 204U in the transformer 201U with the winding 204U interposed between the FET 205U and the high voltage battery 901. A signal from a terminal OUT of the power supply control IC 203U is inputted to the gate of the FET 205U.

The activation circuit 202U is a circuit for supplying electric power necessary for driving the power supply control IC 203U, using the high-voltage DC power supply 901 inputted thereto. If the gate drive power supply circuit 200U is electrically connected to the high voltage battery 901, the activation circuit 202U temporarily supplies electricity to the power supply control IC 203U using electric power from the high voltage battery 901, thereby starting up the power supply control IC 203U for activating the gate drive power supply circuit 200U. After the activation of the gate drive power supply circuit 200U, the power supply control IC 203U is supplied with electricity from the feedback winding circuit 207U. The output of the feedback winding circuit 207U which is supplied to a power supply terminal VCC of the power supply control IC 203U is at a potential of VCC_FB_H.

The power supply control IC 203U turns on the FET 205U, thereby flowing a current through the winding 204U in the primary side of the transformer 201U. Since the current is flowed through the winding in the primary side, magnetic energy is accumulated in the transformer 201U. Further, the power supply control IC 203U turns off the FET 205U, which generates an induced voltage in the plurality of windings in the secondary side of the transformer 201U. The power supply control IC 203U repeats the switching of the FET 205U, which intermittently generates an induced voltage in the windings in the secondary side, and this induced voltage is smoothed by diodes and condensers in the secondary-side winding circuits 206U, thereby supplying gate drive voltages. The gate drive voltages (VCC_UH, VCC_VH, VCC_WH) form the power supplies for voltages to be applied to the gate electrodes of the respective switching devices constituting the upper arms of the inverter circuit 300.

The feedback winding circuit 207U includes a series circuit constituted by a winding and a diode, and a condenser connected in parallel to the series circuit. A power supply is outputted from one end of the feedback winding through the diode. The other end of the feedback winding is at the same potential HVDC_N as that of the bus bar at the negative pole. Furthermore, a series circuit constituted by resistors is connected in parallel to the condenser. The voltage resulted from the voltage division by this series circuit is inputted to a feedback terminal FB of the power supply control IC 203U. The power supply control IC 203U controls the switching of the FET 205U such that the voltage inputted to the feedback terminal FB is constant, which stabilizes the output from the feedback winding and the gate drive voltages at constant voltages.

The backup winding circuit 208U is provided in order to supply electricity to the safety control circuit 112 in the motor control circuit 110. The backup winding circuit 208U includes a series circuit constituted by a winding and a diode, and a condenser and a resistor which are connected in parallel to the series circuit. A power supply is outputted from the backup winding through the diode. The output of the backup winding circuit 208U is at a potential of VCC_Backup_H.

The gate drive power supply circuit 200U supplies the gate drive voltages (VCC_UH, VCC_VH, VCC_WH) for the upper arms of the inverter circuit 300, while the gate drive power supply circuit 200L supplies the gate drive voltages (VCC_UL, VCC_VL, VCC_WL) for the lower arms of the inverter circuit 300. The output of the feedback winding circuit 207L is at a potential of VCC_FB_L. The output of the backup winding circuit 208L is at a potential of VCC_Backup_L.

The gate drive power supply circuit 200U for the upper arms and the gate drive power supply circuit 200L for the lower arms have the same circuit structure. In particular, as the transformers 201U and 201L, it is possible to employ transformers having the same specification. Even in a case where there are a plurality of power supply circuits, by reducing the number of types of transformers, it is possible to enhance a mass production effect, thereby suppressing the increase of the cost.

Figure 3:
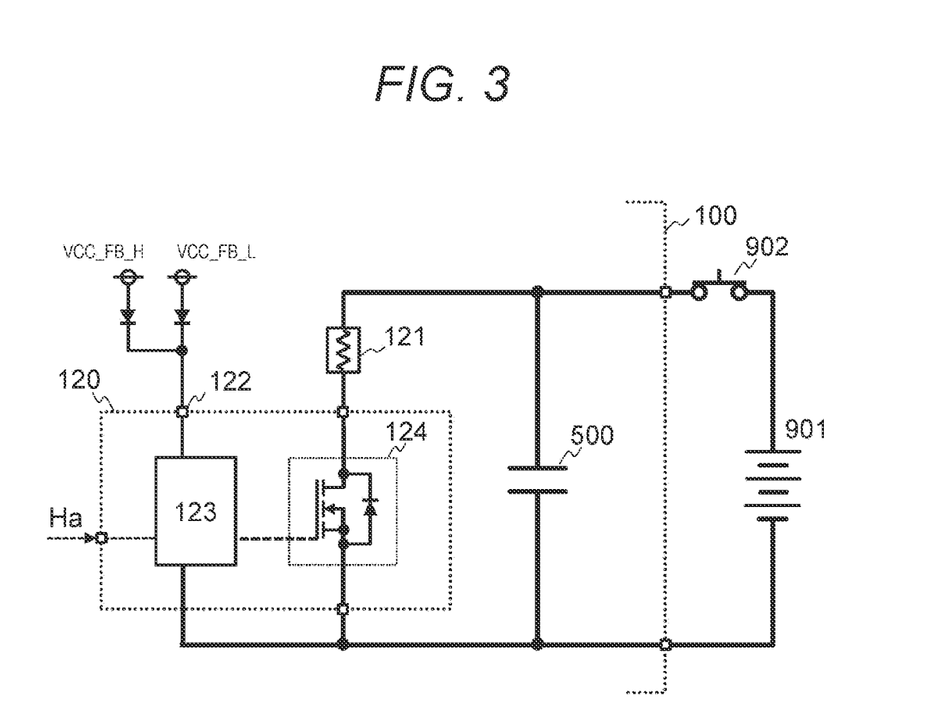
FIG. 3 is a diagram of the structure of an active discharge circuit 120.

FIG. 3 is a diagram of the structure of the active discharge circuit 120. As described above, the active discharge circuit 120 is a circuit for discharging the charge accumulated in the voltage smoothing capacitor 500 in the power conversion apparatus through the discharge resistor 121, in order to lower the voltage to a safe value, when the power conversion apparatus 100 has been stopped.

The active discharge circuit 120 includes a discharge control circuit 123, and a semiconductor device 124 constituted by an FET adaptable to high voltages, or the like. A discharge command Ha from the safety control circuit 112 is inputted to the active discharge circuit 120. The discharge control circuit 123 drives the semiconductor device 124 according to the discharge command Ha. The active discharge circuit 120 includes an isolation interface for transmitting signals between the low-voltage circuit and the high-voltage circuit.

The active discharge circuit 120 is supplied with an active discharge power supply 122, and the discharge control circuit 123 operates using the active discharge power supply 122 as a power supply. The active discharge power supply 122 is redundantly supplied thereto, since the FB output (VCC_FB_H) of the transformer 201U and the FB output (VCC_FB_L) of the transformer 201L are connected to the active discharge power supply 122 through diodes.

Figure 4:
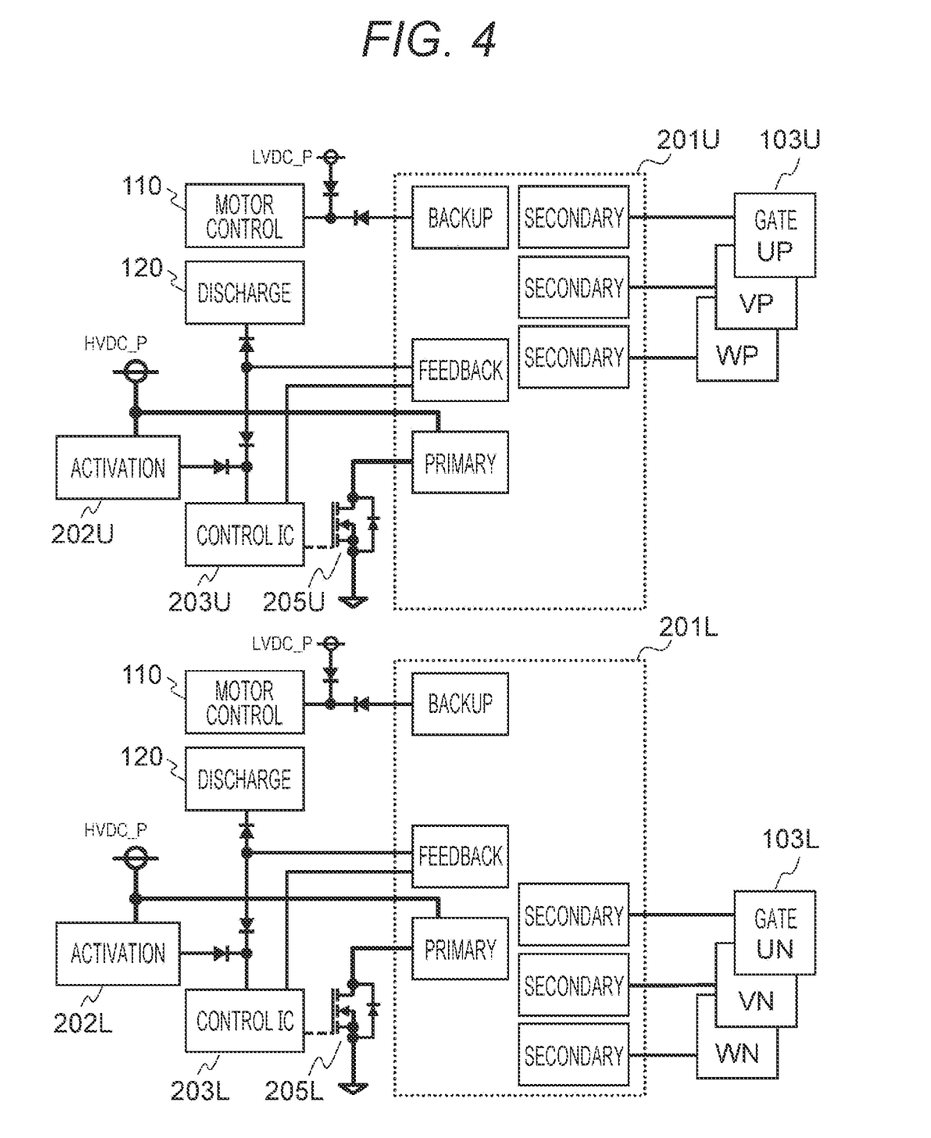
FIG. 4 is a schematic diagram illustrating the structures of the gate drive power supply circuits 200U and 200L according to an embodiment of the present invention.

FIG. 4 is a schematic diagram illustrating the structures of the gate drive power supply circuits 200U and 200L according to the present embodiment. As illustrated in FIGS. 1 and 2, the power supply inputted to the gate drive power supply circuits 200U and 200L is a high-voltage power supply from the DC power supply 901, which is, for example, 400 V. Further, the outputs from the gate drive power supply circuit 200U or 200L are the power supplies (VCC_UH, VCC_VH, VCC_WH, VCC_UL, VCC_VL, VCC_WL) for the gate drive circuit 103U or 103L for the three arms, the backup power supply (VCC_Backup_H, VCC_Backup_L) for the low-voltage circuit (the motor control circuit 110), and the feedback outputs (VCC_FB_H, VCC_FB_L, and the voltage resulted from the voltage division thereof). The gate drive power supply circuits 200U and 200L respectively include the first transformer 201U for the upper arms, and the second transformer 201L for the lower arms. It is possible to employ transformers having the same specification. As the feedback outputs, the voltages resulted from the voltage division are outputted to the control ICs 203U and 203L, as feedback voltages depending on the voltages outputted to the gate drive circuits 103U and 103L, respectively. Further, as illustrated in FIGS. 1 and 3, the respective outputs from the gate drive power supply circuits 200U and 200L for the upper and lower arms are connected to each other through diodes OR and are supplied to the active discharge circuit 120, as a power supply. As illustrated in FIG. 1, as the backup power supply outputs, the respective outputs from the gate drive power supply circuits 200U and 200L for the upper and lower arms are connected to each other through diodes OR and are supplied to the low-voltage circuit (the motor control circuit 110).

Figure 5:
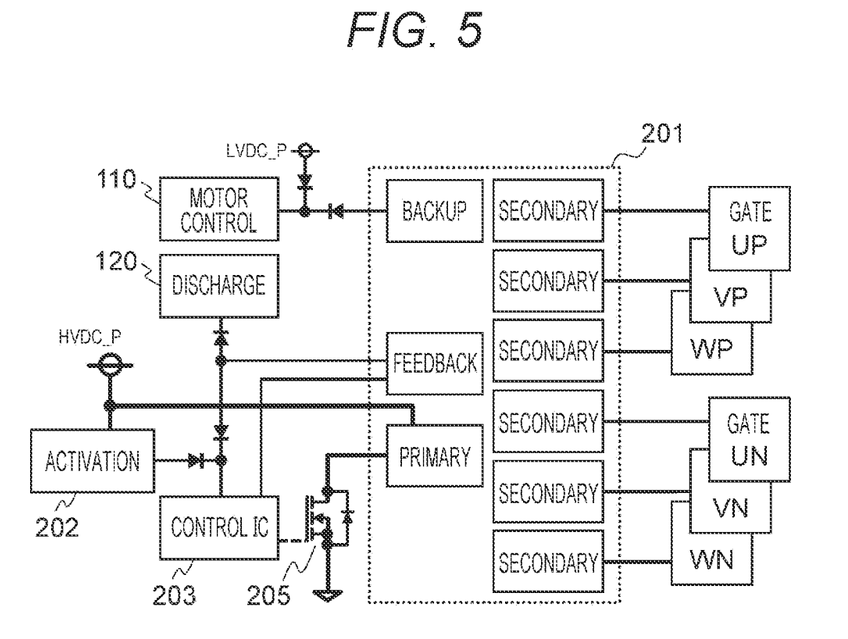
FIG. 5 is a schematic diagram illustrating the structure of a centralized gate drive power supply circuit using a high-voltage power supply as an input (a first comparative example).

FIG. 5 is a schematic diagram illustrating the structure of a centralized gate drive power supply circuit using a high-voltage power supply as an input, as a first comparative example. The outputs thereof are power supplies for gate drive circuits for six arms, a backup power supply for a low-voltage circuit, and a feedback output. The gate drive power supply circuit in FIG. 5 includes a single transformer 201, while the gate drive power supply circuit in FIG. 4 includes the two transformers. The single transformer covers the power supplies for the six arms, which necessitates a transformer having a larger size than that of the embodiment in FIG. 4 and, also, increases the size of an FET 205 for current control. This increases the cost of a single gate drive power supply circuit. Furthermore, in the event of loss of the low-voltage power supply, the safety control circuit 112 can be operated by being supplied with electricity from the backup power supply. However, when the low-voltage power supply is lost, if the gate drive power supply circuit also fails, it is impossible to perform safety control operations.

Figure 6:
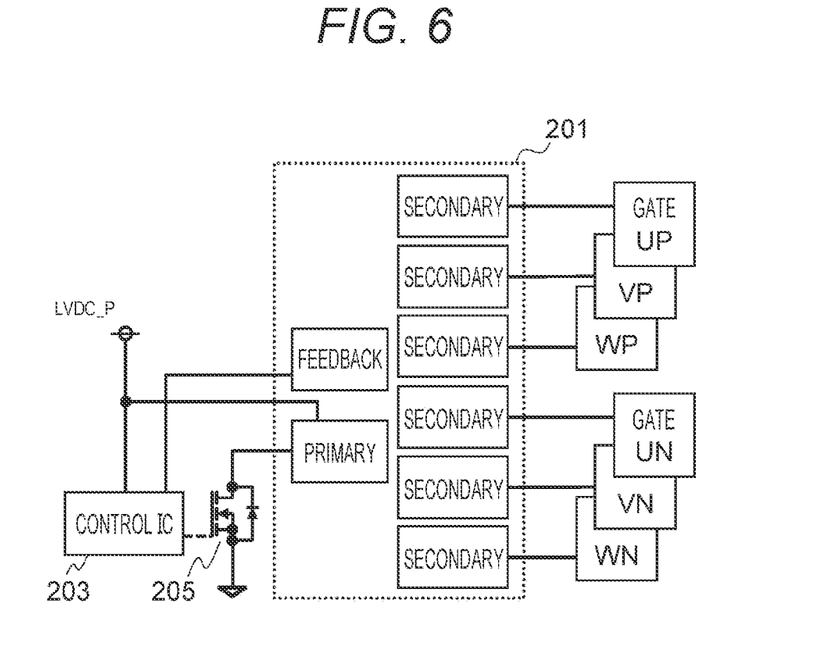
FIG. 6 is a schematic diagram illustrating the structure of a centralized gate drive power supply circuit using a low-voltage power supply as an input (a second comparative example).

FIG. 6 is a schematic diagram illustrating the structure of a centralized gate drive power supply circuit using a low-voltage power supply as an input, as a second comparative example. The outputs thereof are power supplies for gate drive circuits for six arms, and a feedback output. The gate drive power supply circuit includes a single transformer 201, similarly to the gate drive power supply circuit in FIG. 5. In the case of using the low-voltage power supply as the input, in order to prepare for the loss of the low-voltage power supply, it is necessary to separately provide a backup power supply for generating a low-voltage power supply from a high-voltage power supply.

Figure 7:
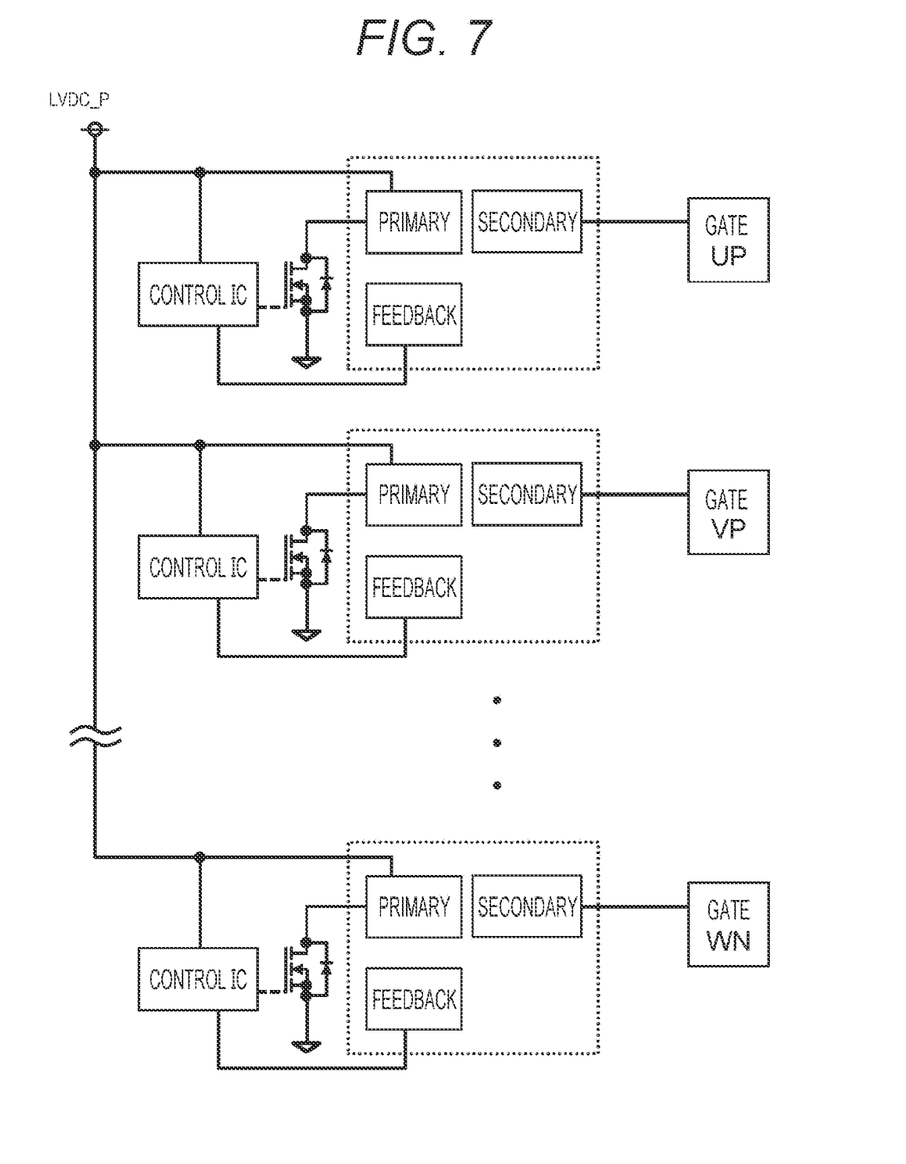
FIG. 7 is a schematic diagram illustrating the structure of a distributed gate drive power supply circuit using a low-voltage power supply as an input (a third comparative example).

FIG. 7 is a schematic diagram illustrating the structure of a distributed gate drive power supply circuit using a low-voltage power supply as an input, as a third comparative example. The gate drive power supply circuit includes one transformer for a power supply output for each single arm, unlike the gate drive power supply circuit in FIG. 6. Namely, the gate drive power supply circuit includes six transformers for six arms. In this case, similarly to in the gate power supply circuit in FIG. 6, in order to prepare for the loss of the low-voltage power supply, it is necessary to separately provide a backup power supply for generating a low-voltage power supply from a high-voltage power supply. Incidentally, in a case of such a distributed gate drive power supply circuit, it is a common practice to use a low-voltage power supply as an input thereof, instead of a high-voltage power supply. This is for the following reasons. That is, the gate drive power supply circuit should be increased in size to adapt to a high voltage, it is difficult to increase the inductance value of the primary winding for adapting it to a high voltage inputted thereto, and it is disadvantageous in view of area to install wirings for six high-voltage inputs on the substrate.

In contrast to the comparative examples illustrated in FIGS. 5 to 7, the present embodiment illustrated in FIG. 4 has the following advantages. The motor control circuit 110 operates by being supplied with electricity from the low-voltage power supply LVDC_P (the low voltage battery 10). Since the backup power supply is provided in the present embodiment, in the event of loss of the low-voltage power supply, the motor control circuit 110 (the safety control circuit 112) can be operated by being supplied with electricity from the backup power supply. Furthermore, since there are provided the backup power supply in the gate drive power supply circuit 200U and the backup power supply in the gate drive power supply circuit 200 L, in the present embodiment, even if any of the gate drive power supply circuits fails when the low-voltage power supply is lost, it is possible to perform safety control operations by electricity supplied from the backup power supply in the remaining gate drive power supply circuit.

The safety control circuit 112 can be operated by being supplied with electricity from the low voltage battery 10 or by being supplied with electricity from the backup winding circuit 208U or 208L. Therefore, even if any one of the backup power supplies fails when the low-voltage power supply is lost, the safety control circuit 112 can output a three-phase short-circuiting signal, by being supplied with electricity from the other backup power supply.

Further, even if any one of the backup power supplies fails when the low-voltage power supply is lost, the safety control circuit 112 can output a discharge command Ha to the active discharge circuit 120 by being supplied with electricity from the other backup power supply. The active discharge circuit 120 is supplied with electricity from the backup power supply in the gate drive power supply circuit 200U and the backup power supply in the gate drive power supply circuit 200L. Therefore, even when any one of the gate drive power supply circuits is failed, the active discharge circuit 120 can be operated by being supplied with electricity from the other backup power supply.

Figure 8:
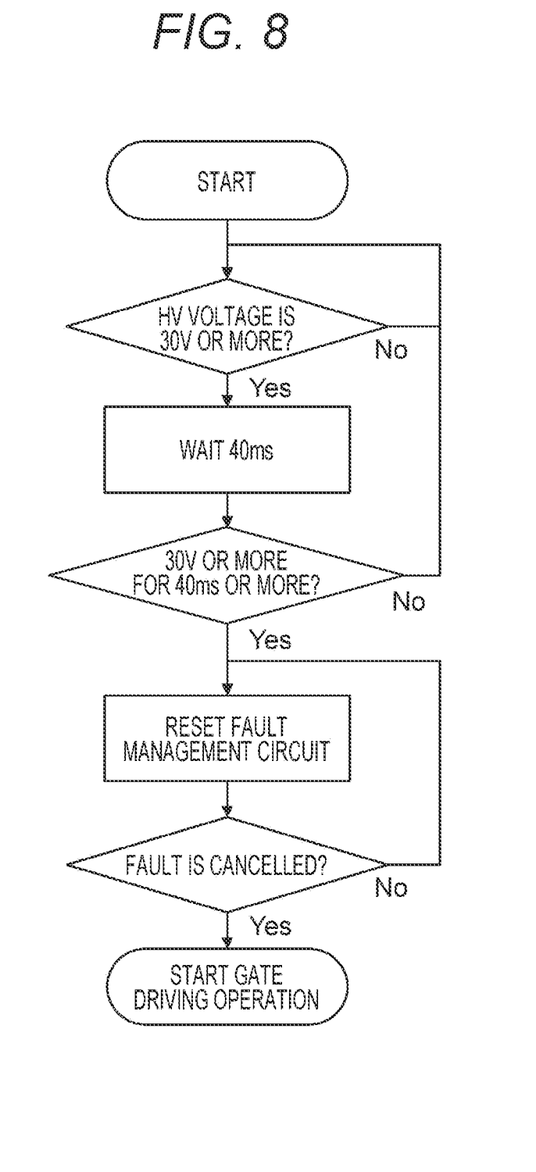
FIG. 8 is a diagnosis flowchart according to a conventional method.
Figure 9:
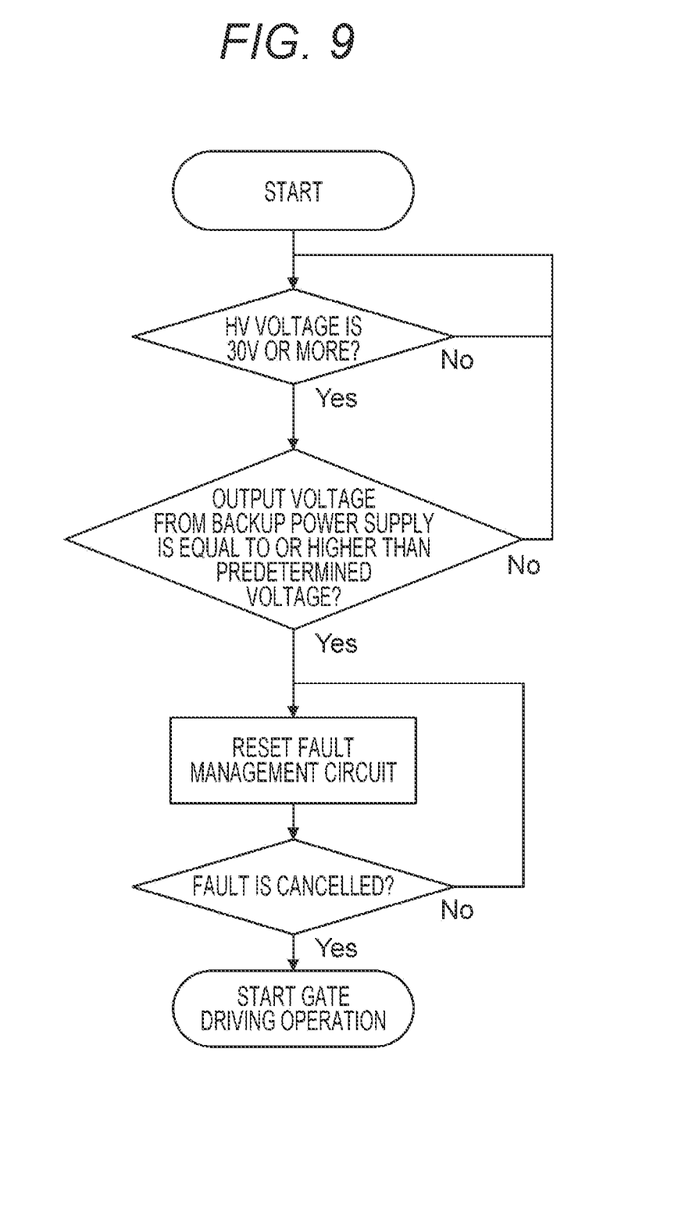
FIG. 9 is a diagnosis flowchart according to the embodiment of the present invention.

Further, with reference to FIGS. 8 and 9, there will be described a diagnosis flowchart from turn-on of the HV power supply to start of a gate driving operation. FIG. 8 illustrates a diagnosis flowchart according to a conventional method, and FIG. 9 illustrates a diagnosis flowchart according to the present embodiment.

If the low-voltage power supply (the low voltage battery 10) is turned on to bring the power conversion apparatus into an ignition-on state, this causes the motor control circuit to operate, thereby starting operations of the CPU in the circuit. Before the power conversion apparatus starts operating, a program for diagnosing whether there is an abnormality in the power conversion apparatus is operated. This diagnosing program also includes an item for diagnosing whether there is an abnormality in the gate drive circuits. The diagnosis of the gate drive circuits is required to be performed after the gate drive power supply circuits have been stabilized. This is because the gate drive circuits are in an abnormal state before the power supplies are stabilized, as a matter of course.

Further, the motor control circuit includes a fault management circuit for managing an abnormality in the gate drive circuits. If a signal (a fault signal) indicating an abnormal state of the gate drive circuits is inputted to the fault management circuit, fault the management circuit holds abnormality occurrence information and notifies the CPU of the abnormality occurrence information. If the CPU detects an abnormality notification from the fault management circuit, the CPU performs abnormality processing. Further, if the CPU determines that the gate drive circuits can be restored to a normal state, the CPU resets the fault management circuit and clears the abnormality occurrence information. Abnormal states of the gate drive circuits include UVLO (under voltage lock out), OVLO (over voltage lock out), overcurrent detection, and overtemperature detection, for example.

Since the gate drive power supply circuits are constituted by a high-voltage power supply, the voltage of the high-voltage power supply triggers the diagnosis. Conventionally, after a confirmation of that a monitored value of the voltage of the high-voltage power supply, which is constantly monitored, has been maintained at 30 V or more for 40 ms or more, the fault management circuit is reset with expectation that UVLO of the gate drive circuits will be cancelled. When the gate drive circuits have been normally activated, the abnormality occurrence information from the fault management circuit is cleared, which allows the inverter to start operating. Note that the numerical values of 30 V and 40 ms are examples. As the waiting time, a longest time has been set in consideration of the voltage of the high-voltage power supply, the temperature, and component variations.

In the structure according to the present embodiment, the output voltage from a backup power supply and the voltages of the gate drive power supplies are generated from one transformer, and, therefore, there is a correlation between these voltages. Therefore, by monitoring the output voltage from the backup power supply with the motor control circuit 110, it is possible to estimate the rise of the voltages of the gate driving power supplies, based on the output voltage from the backup power supply, which eliminates the necessity of setting the waiting time. Namely, it is possible to quickly transition to a gate driving operation according to operating conditions such as the rising speed of the high voltage and the temperature.

REFERENCE SIGNS LIST 10 low voltage battery
20 current detector
100 power conversion apparatus
101 gate driving command
103 gate drive circuit
104 gate driving signal 110 motor control circuit
111 auxiliary power supply circuit
112 safety control circuit
120 active discharge circuit
121 discharge resistance
122 active discharge power supply
123 discharge control circuit
124 semiconductor device
130 high voltage sensor circuit
200 gate drive power supply circuit
201 transformer
202 activation circuit
203 power supply control IC
204 primary-side winding
205 FET
206 secondary-side winding circuit
207 feedback winding circuit
208 backup winding circuit
300 inverter circuit
500 voltage smoothing capacitor
900 motor
901 high voltage battery
902 contactor

The invention claimed is:

1. A power conversion apparatus for converting DC power supplied from a DC power supply into AC power, the power conversion apparatus comprising:
 a plurality of switching devices constituting upper arms and lower arms of respective phases in a three-phase inverter circuit;
 a plurality of drive circuits for driving the respective plurality of switching devices;
 a power supply circuit for suppling a power supply to the plurality of drive circuits; and
 a discharge circuit for discharging a capacitor connected in parallel to the three-phase inverter circuit, wherein
 the power supply circuit includes a first transformer and a second transformer which include a primary winding connected in parallel to the DC power supply,
 the first transformer includes a secondary winding for supplying a power supply to the drive circuits for driving the plurality of switching devices constituting the upper arms, and for supplying a power supply to a low-voltage circuit connected to a low-voltage power supply,
 the second transformer includes a secondary winding for supplying a power supply to the drive circuits for driving the plurality of switching devices constituting the lower arms and for supplying a power supply to the low-voltage circuit,
 each of the first transformer and the second transformer includes a feedback winding for outputting a feedback voltage corresponding to a voltage output to the drive circuits, to a power supply control IC, and
 the discharge circuit is driven by a power supply supplied from the feedback winding in the first transformer and the feedback winding in the second transformer.

2. The power conversion apparatus according to claim 1, further comprising a voltage sensor circuit which is connected in parallel to the three-phase inverter circuit and detects a voltage applied to the capacitor,
 wherein the secondary winding in the first transformer and the secondary winding in the second transformer supply a power supply to the low-voltage circuit and also supply a power supply to the voltage sensor circuit.

3. The power conversion apparatus according to claim 1, wherein the first transformer and the second transformer comprise transformers having a same specification.

4. The power conversion apparatus according to claim 1, wherein the low-voltage circuit estimates an activation state of the drive circuits, based on voltages supplied from the first transformer and the second transformer.

* * * * *